(12) United States Patent
Heinmiller et al.

(10) Patent No.: US 7,751,532 B2
(45) Date of Patent: Jul. 6, 2010

(54) CALL TRACKING SYSTEM

(75) Inventors: Wayne Robert Heinmiller, Elgin, IL (US); Robert Anthony Michalski, Algonquin, IL (US); Dianna Inara Tiliks, Palatine, IL (US); Carol Shifrin Gruchala, Naperville, IL (US)

(73) Assignee: AT&T Intellectual Property I, LP, Reno, NV (US)

( * ) Notice: Subject to any disclaimer, the term of this patent is extended or adjusted under 35 U.S.C. 154(b) by 1218 days.

(21) Appl. No.: 11/249,861

(22) Filed: Oct. 13, 2005

(65) Prior Publication Data

US 2007/0116235 A1    May 24, 2007

(51) Int. Cl.
*H04M 1/24*  (2006.01)
*H04M 3/08*  (2006.01)
*H04M 3/22*  (2006.01)

(52) U.S. Cl. .............. 379/32.04; 379/15.02; 379/32.01; 379/112.01; 379/112.06

(58) Field of Classification Search .............. 379/32.01, 379/32.03, 32.04, 32.05, 112.01, 112.06, 379/112.08, 133, 134, 136, 137, 138, 140, 379/229, 230, 15.02, 221.08, 221.09, 221.12
See application file for complete search history.

(56) References Cited

U.S. PATENT DOCUMENTS

| 6,084,872 | A  | * | 7/2000 | Munson et al. ............. 370/351 |
| 6,373,934 | B2 |   | 4/2002 | Jensen |
| 6,515,968 | B1 | * | 2/2003 | Combar et al. ............. 370/252 |
| 6,792,089 | B2 |   | 9/2004 | Tiliks et al. |
| 6,882,718 | B1 |   | 4/2005 | Smith |
| 2002/0118813 | A1 | * | 8/2002 | Brehm et al. ............... 379/229 |
| 2007/0019624 | A1 | * | 1/2007 | Munson et al. ............. 370/352 |

\* cited by examiner

*Primary Examiner*—Binh K Tieu
(74) *Attorney, Agent, or Firm*—Larson Newman & Abel, LLP

(57) ABSTRACT

The embodiments relate to methods and apparatuses for tracking data calls placed to or from a terminal of a call service subscriber using of an advanced intelligent network in real time in a communications network. A SDS query to an SCP in communication with a database is made when a specific trigger for a call assigned to a subscriber is detected. Call information and subscriber number data is extracted from the SDS query and saved in the database.

18 Claims, 7 Drawing Sheets

| Field | Description |
|---|---|
| Start Time | 1129016229 |
| Time Zone | Central Standard Time |
| End Time | 1129018062 |
| Calling Party Number | 1.555.579.8902 |
| International Calling Party | None |
| Call Result | 03 |
| Calling Party Name | SBC Knowledge Ventures |

*FIG. 8*

CALL TRACKING SYSTEM

FIELD

The embodiments relate to methods, a system, and computer instructions on computer readable media for tracking the disposition of calls and for analyzing calls of a subscriber using an advanced intelligent network.

BACKGROUND

Presently, customers using the public switched telephone network (PSTN) receive limited information regarding in going and outgoing telephone calls. The telephone call information received is presently based on call detail records. The telephone call information is usually provided to the customers in the form of periodic bills from the network provider or telephone service provider. The call detail records, on which the telephone call information is based, are accessible by the network provider at a host central processing unit.

The current call detail record system has certain drawbacks. For example, a subscriber can not easily view real time, usage for a particular number, either for incoming or outgoing calls. Access to current, real time, up to the minute usage information for calls within a network are not maintained by the network or otherwise accessible to the network provider and customers. Therefore, the customers are not able to track calls to a packet network easily.

Information is made available to the customers periodically, in a format determined by the network provider at the provider's discretion.

A need exists for a manner to track calls that differs fundamentally from the conventional call tracking, particularly with regard to the disposition of calls for a subscriber which is accessible real time, such as through a website.

A need exists for a manner to track calls that overcomes the disadvantages of static statistic collection for a communications network for incoming and outgoing calls.

A need exists for a manner to allow for user viewing and monitoring of call disposition for a network.

A need exists to know accurately, in real time, call statistics and call dispositions for multiple phone calls including data calls.

The embodiments overcome problems associated with the prior art to meet these needs.

BRIEF DESCRIPTION OF THE DRAWINGS

The detailed description will be better understood in conjunction with the accompanying drawings as follows:

FIG. 8 is a sample of a call tracking report for a call service subscriber.

Figure 1:
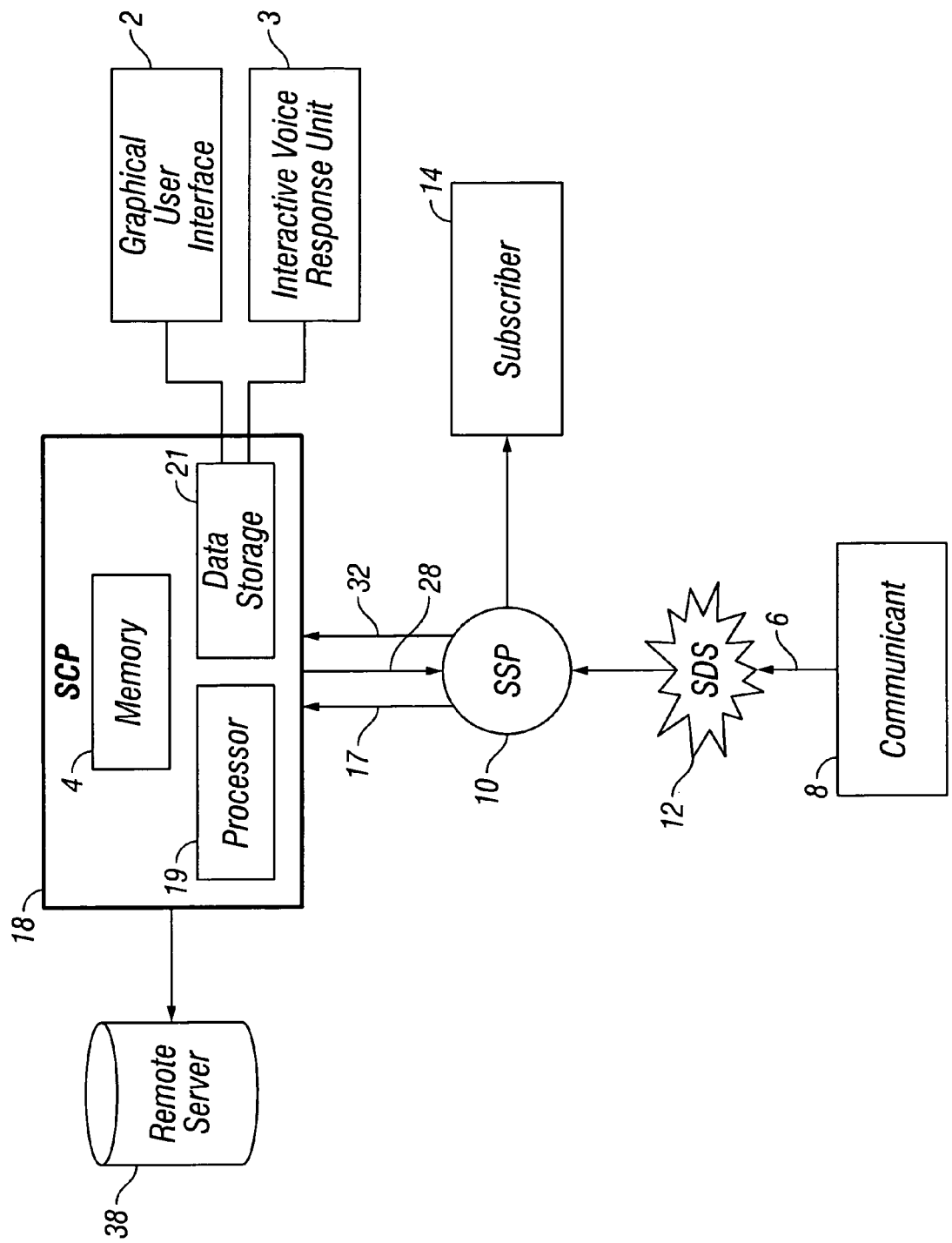
FIG. 1 is a flow diagram depicting the incoming call flow.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

Acronyms—The written description provided herein contains acronyms which refer to various telecommunications services, components and techniques, as well as features relating to the present disclosure. Although some of these acronyms are known, use of these acronyms is not strictly standardized in the art. For purposes of the written description herein, the acronyms are defined as follows: Advanced Intelligent Network (AIN); Authorize Termination Response (ATR); Central Exchange Service (Centrex); Dual Tone Multi-Frequency (DTMF); Electronic Key Telephone System (EKTS); Graphical User Interface (GUI); HyperText Mark-Up Language (HTML); HyperText Transfer Protocol (HTTP); Interactive Voice Response (IVR); Line Information Database (LIDB); Local Access and Transport Area (LATA); Outgoing Call Control (OCC); Off Hook Delay (OHD); Personal Call Manager/Personal Communications Manager (PCM); Personal Identification Number (PIN); Plain Old Telephone Service (POTS); Private Branch Exchange (PBX); Send Notification Response (SNR); Service Control Point (SCP); Service Management System (SMS); Service Switching Point (SSP); Signaling System 7 (SS7); Signaling Transfer Point (STP); Transmission Control Protocol/Internet Protocol (TCP/IP); and Voice over Internet Protocol (VoIP).

As used herein, the term "subscriber" refers to an entity which purchases services from a communication network which uses an advanced intelligence network (AIN) as described herein. The subscriber can be a person or entity placing a call or a person or entity receiving a call. The subscriber can be referred to as a call service subscriber.

As used herein, the term "subscriber device" refers to a device to which calls can be transmitted using a network address, such as a Voice over Internet Protocol (hereinafter VoIP) phone system. The transmission can be to the device or from the device by the subscriber as defined herein. A subscriber device can be part of the network or a separate unit that communicates with the network. For example, in the public switched telephone network, when a subscriber answers a ringing telephone, the telephone is a subscriber device, and the person is a subscriber. In contrast, when a telephone answering machine automatically answers a call, the telephone answering machine is both a subscriber device and a subscriber.

Calls to subscriber devices can be either "busy" or "answered". Each of these conditions needs to be tracked for effective use of a communications network.

The present embodiments include a method of tracking data calls to or from a terminal of a call service subscriber, a system for tracking data calls to or from a terminal of a call service subscriber, and a program on computer readable medium which utilize an advanced intelligence network (AIN) to establish a set of data that is dynamic and can be monitored and used to automatically improve communications performance of the communication network.

The advanced intelligent network (AIN) tracks calls and forms statistics on call usage and disposition of a subscriber to a communications network using a specific digit string trigger (SDS) associated with that particular subscriber. The AIN can receive data calls over a communication line. An off hook delay (OHD) trigger is an example of one trigger usable on a subscriber line to capture outgoing calls. A Custom Dialing Plan trigger can be used on other types of phone lines, such as a Centrex line, to capture outgoing call information.

The AIN can include a service control point (SCP) which communicates with a service switching point (SSP).

An aspect of the present invention provides a method for tracking calling data based on usage. The method includes storing information related to a subscriber in data storage at the service control point (SCP) which includes a processor with memory and data storage. The SCP can include a calling party number, a called party number, a call date, a call time, and combinations thereof. The data storage can be accessed by a call service subscriber.

Incoming calls communicate with an advanced intelligence network (AIN). The AIN analyzes the call for detection of an SDS trigger. If an SDS trigger is detected, the call can be linked to a subscriber.

When the SDS trigger is detected, the AIN formulates an SDS query for use in the SCP.

The SCP has a processor and data storage for supporting a database of subscriber information. The SCP has computer instructions for providing information on a source of the incoming call, providing a time and date stamp on the incoming call, and providing a subscriber number for the call.

The SCP then takes two actions. The SCP stores call information resulting from the SDS query with the trigger to data storage and also forms an authorize termination response (ATR) which contains a send notification request (SNR).

The processor with data storage also permits a call service subscriber, administrator, or other authorized user to have access to the call information in data storage by displaying on a graphical user interface (GUI), website, or other client device accessible over the Internet, near real-time viewing of the call data associated with the results of a query transmitted to the service control point. The data storage can be accessed by an interactive voice response unit.

The web based network can include a subscriber interface, a service switching point (SSP) in communication with the subscriber interface, and a communicant and a subscriber.

By tracking a call that originates from a first source to a subscriber of this service, tracking and viewing of call statistics can be made, as well as call dispositions. The term "call" can relate to incoming calls to the subscriber, outgoing calls from the subscriber, or combinations thereof. The "call" can be data calls, voice calls or voice over Internet Protocol (IP) calls.

A telecommunications network can include a calling party device, an originating SSP, a terminating SSP, and a called party telephone. The network can also include a signaling transfer point (STP) and a service control point (SCP). For example, a SCP can be implemented with a Service Control Point (SCP) available from Lucent Technologies, Inc. of Murray Hill, N.J. or a Telcordia Integrated Service Control Point, loaded with ISCP software Version 4.4 or higher, available from Telcordia, of Piscataway, N.J.

A SSP acts as the originating central office for the calling party telephone and the SSP is the terminating central office for the called party telephone. The terminating central office and the originating central office can be the same, or there can be any number of intervening switches routing the connection between the calling party telephone and the called party telephone.

The SSP can be a 1AESS or 5ESS switches manufactured by Lucent Technologies, Inc. of Murray Hill, N.J. or DMS-100 and DMS-10 switches manufactured by Nortel Networks Corporation (Nortel) of Brampton, Ontario, or AXE 10 switches manufactured by Telefonaktiebolaget LM Ericsson of Stockholm, Sweden, or ESWD switches manufactured by Siemens AG of Munich, Germany.

The 1AESS Switches can use an AIN Release 0.1 protocol and should be equipped with Generic 1AE13.01 (or higher) software and associated AIN SSP features. The 5ESS switches can utilize an AIN Release 0.1 protocol and should be equipped with Generic 5E12 (or higher) software and associated AIN SSP features. The DMS-100 switches (release NA009) can utilize and AIN Release 0.1 protocol and associated AIN SSP features. The AXE-10 switches can utilize and AIN Release protocol and should be equipped with Generic 8.07 (or higher) software and associated AIN SSP features. The ESWD switches should be equipped with Release 11 (or higher) and can utilize and AIN Release 0.1 protocol and associated AIN SSP features. SCPs can collect information using an SR3389 protocol.

The call service logic of the present invention can be upgraded to accommodate future AIN releases and protocols and future trigger types. Specifications of AIN Release 0.1 SSPs can be found in Telecordia GR-1298-CORE Switching System. Examples of SSP/SCP protocols can be found in GR-1299-CORE Switch-Service Control Point/Adjunct Interface.

In an embodiment, AIN triggers are placed on the subscriber line, such as a subscriber's end line. An Off Hook Delay (OHD) trigger on the subscriber line captures outgoing calls. Some calls can be programmed to escape the OHD trigger.

Centrex lines can use a Custom Dialing Plan (CDP) trigger to capture outgoing call information.

Triggers activated by the SSP cause call data to be sent to the SCP for processing and data extraction. The call data includes a called party number and the calling party number. The SCP then collects additional call data, such as geographic locations, duration of the call, and other data.

The SCP formats the information and forwards the information to a database such as a CNAM database, which can be used to collect data, and forms web based information access on a real time basis concerning the statistics and disposition of calls. The SCP can send a message to the SSP when the call is completed. An authorize termination with send notification message can be sent to an SSP.

An AIN SCP can be used to track calls and provide a means to query data stored in a database of the communications network. The AIN SCP can be used to query zip code information or area code information for calls made from or placed to subscribers of the communications network. The call can be routed to the subscriber and the information obtained by the SCP is stored in the database.

Once an incoming call is completed, the SSP can send a termination notification message to the SCP. The SCP can extract from the termination notification message data including call duration and the busy/answer status of the call. This data is assembled into a data packet which is then stored at the SCP. Data associated with AIN messages and parameters are sent from the SCP to a remote server.

For situations that involve outgoing calls from a subscriber, the subscriber originates a call. The AIN detects an off hook delay or custom dialing plan trigger, and launches an information query to the SCP. Off hook delays and CDP triggers relate to an originating call model. The SCP obtains the address of the called party and other call information including the time and date of the call from the information query.

The SCP then sends an analyze route response containing a send notification request. The SSP then routes the call to the called number.

After the called party disconnects, the SSP sends a termination notification message to the SCP. TAT and SDS triggers relate to terminating call models. The SCP extracts the duration of the call and the status of the call, and the busy/answered status of the call from the termination notification message.

The data is then packaged into a data packet and is saved with the other data relative to the subscriber in the CNAM database along with associated AIN messages and parameters. These additional data packets can also be periodically transmitted to a remote server for archiving and additional analysis and reporting.

The results of call tracking by the AIN SCP can result in a chart, a report, a graph of the call statistics or disposition of calls for subscriber by a user such as with a user interface, a telephone, a computer, a cellular phone, a Blackberry® handheld communication device, a personal digital assistant (PDA) or similar communication device.

The present embodiments contemplate tracking of call disposition, which refers to calls that are either answered, unanswered, or busy. The tracking can be from a phone or other electronic device having an address. The results of the call tracking can yield information on a particular calling device, and information on network capacity utilization.

The present embodiments contemplate creating call statistics and presenting them to a user on a real time basis, wherein the statistics can be a geographic area of call origination by area code, geographic area of call origination by zip code; the time required to answer a call; time and date a call was handled; length of time of a call using the number from which a call originated; length of time of a call using the number from which a call terminated, and combinations thereof. The geographic area relates to the physical locations of communicants in the network and can even include the distances between the communicants.

The time and date information is a form of temporal data. The temporal data include time of day or day of the week data, measures of elapsed time since the occurrence of a specified event or condition, measures of elapsed time between specified events or condition, a specific time interval, a time range, a date range or combinations of these types of data.

The embodied communication networks utilize an advanced intelligent network to track and analyze call statistics and calls in the communications network; and a web based network adapted to provide information access on a real time basis concerning the call statistics and disposition of calls to a user.

The advanced intelligent network continuously compares the calls to predetermined parameters to provide real time statistics and dispositions of calls to the web based network. The web based network can have one or more processors with memory in communication with data storage and a user interface. The advanced intelligent network continuously compares the real-time call data with predetermined call categories to generate a plurality of call statistics for display on the user interface.

The embodied methods can include forming a continuously updating call statistic for the data calls associated with the SDS. For example, the continuously updating call statistic can be an answered call, an unanswered call, a busy signal, time taken to answer a call, call duration, origination location of the call, time taken to indicate that call is busy, time taken to receive a busy signal, and combinations thereof. The embodied methods can include storing the continuously updating call statistic to data storage of the SCP.

The embodied methods described are intended for operation as software programs running on a computer processor. Dedicated hardware implementations including but not limited to application specific integrated circuits, programmable logic arrays and other hardware devices can be contracted to implement the methods described herein.

Alternative software implementations include, but are not limited to, distributed processing or component/object distributed processing, parallel processing or virtual machine processing can also be constructed to implement the methods described herein.

The software implementations can be optionally stored on a tangible storage medium, such as a magnetic medium, including a disk or tape; a magneto-optical or optical medium, including a disk; or a solid state medium, such as a memory card or other packages that house one or more read-only (non-volatile) memories, random access memories, or other re-writable (volatile) memories.

A digital file attachment to e-mail or other self contained information archive or set of archives is considered a distribution medium, as listed herein and including art-recognized equivalents and successor media, in which the software implementations herein are stored.

Although the present specification describes components and functions implemented in the embodiments with reference to particular standards and protocols, the present embodiments are not limited to such standards and protocols.

Each of the standards for Internet and other packet switched network transmissions, such as TCP/IP, TCAP, GDI, SMTP and public telephone networks (AIN) represent examples of the state of the art. Such standards are periodically superseded by faster or more efficient equivalents having essentially the same functions. Accordingly, replacement standards and protocols having the same functions are considered equivalents.

The present embodiments are directed toward computer readable medium for storing a program for implementing a method for tracking data calls placed to or from a terminal of a call service subscriber.

The method of the program can include a placing code segment that places a specific digit string trigger (SDS) on a communication line of a call service subscriber. The method of the program can include a receiving code segment that receives data calls over the communication line by an advanced intelligence network (AIN) comprising a service control point (SCP), wherein the data calls can include a subscriber number, a calling party number, a called party number, a call date, a call time, and combinations thereof. The method of the program can include a forming code segment that forms a continuously updating call statistic to data storage of the SCP and a storing code segment that stores the continuously updating call statistic to data storage of the SCP. The term "continuous updating" includes periodic updates or irregular intermittent updating.

The method of the program can include an access code segment that accesses the data storage by the call service subscriber. The method of the program can include a generating code segment that generates a report of the continuously updating call statistic of the call data for the call service subscriber.

In an embodiment, a system for tracking data calls placed to or from a terminal of a call service subscriber can include an advanced intelligence network that has one or more service control points (SCP). Each SCP includes a processor, memory, and data storage. The system can include computer instructions for instructing the processor to place on a communication line of a call service subscriber a specific digit string trigger (SDS) and to track call data. The SDS is associated with a data call to or from the call service subscriber. The system can include computer instructions for instructing the processor to form a continuously updating call statistic for the data calls associated with the SDS and to store the formed continuously updating call statistic. The continuously updating call statistic can be an answered call, an unanswered call, a busy signal, time taken to answer a call, call duration, origination location of the call, time taken to indicate that a call is busy, time taken to receive a busy signal, and combinations thereof. The system can include computer instructions for instructing the processor to generate a report of the continuously updating call statistic. The call service subscriber can use a graphical user interface to access the stored continuously updated call statistic. The system can include computer instructions for instructing the processor to display in near real-time the call data in association with the results of a query transmitted to the service control point on the graphical user interface. The call service subscriber and utilize an interactive voice response unit to access the data storage.

Figure 2:
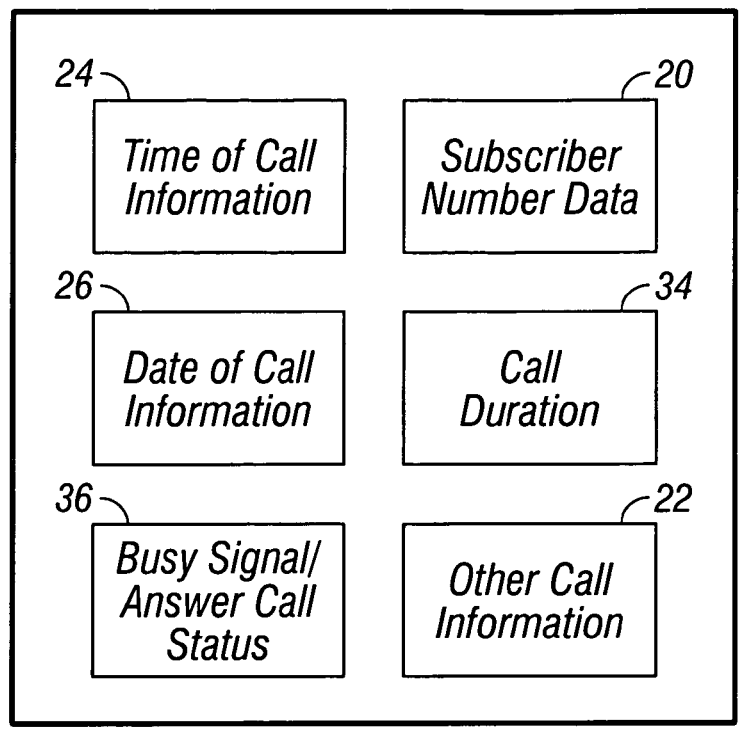
FIG. 2 depicts information tracked and stored during incoming call flow.

With reference to the figures, FIG. 1 and FIG. 2 provide details on the methods for tracking and analyzing an incoming call of a subscriber (14) in a communications network. FIG. 1 is a flow diagram depicting the incoming call flow. FIG. 2 depicts information tracked and stored during incoming call flow.

An incoming call (6) from a communicant (8) can be tracked by using an advanced intelligent network with SSP (AIN SSP) (10) to detect a Specific Digit String trigger (SDS) (12) assigned to a subscriber (14) of the call tracking system.

The AIN SSP (10) can be adapted to formulate a SDS query (17) based on the presence of a SDS (12) associated with the subscriber (14). A subscriber (14) can be a person, a business, a base station or other terminal for receiving calls, which can be voice calls or data calls. The AIN SSP (10) then sends an SDS Query, (17) to a SCP (18). The SCP (18) can have a processor (19), memory (4) and a data storage (21).

The SCP (18) then extracts call information concerning the source of the incoming call from the SDS Query (17) which includes obtaining the time of call information (24), date of call information (26), and a subscriber number data (20) from the SDS Query (17). Other call information (22) includes geographic area of call origination by area code, geographic area of call origination by zip code, time required to answer a call, duration of a call and combinations thereof.

The SCP (18) stores the subscriber number data (20) and other call information (22) along with time information (24) and date information (26) concerning the incoming call, such as, 2:05 pm, Sep. 9, 2005, in data storage (21). The data storage (21) can be accessed by a graphical user interface (2) or an interactive voice response unit (3).

The SCP (18) sends an authorized termination response (28) that contains a send notification request to the AIN SSP (10) which in turn routes the incoming call (6) to the subscriber (14). The subscriber (14) takes the incoming call (6), completes the call and disconnects from the communicant (8).

Upon disconnecting from the call, the SSP sends a Termination Notification Message (32) to the SCP (18) which extracts call duration (34), and busy signal or answered call status information (36) from the Termination Notification Message (32) forming a data packet. The data packet is stored with the information and subscriber number data (20) and stored in the data storage (21).

Periodically, the data packet and related information are transmitted from the SCP to a remote server (38) for analysis, additional archival storage and reporting.

Figure 4:
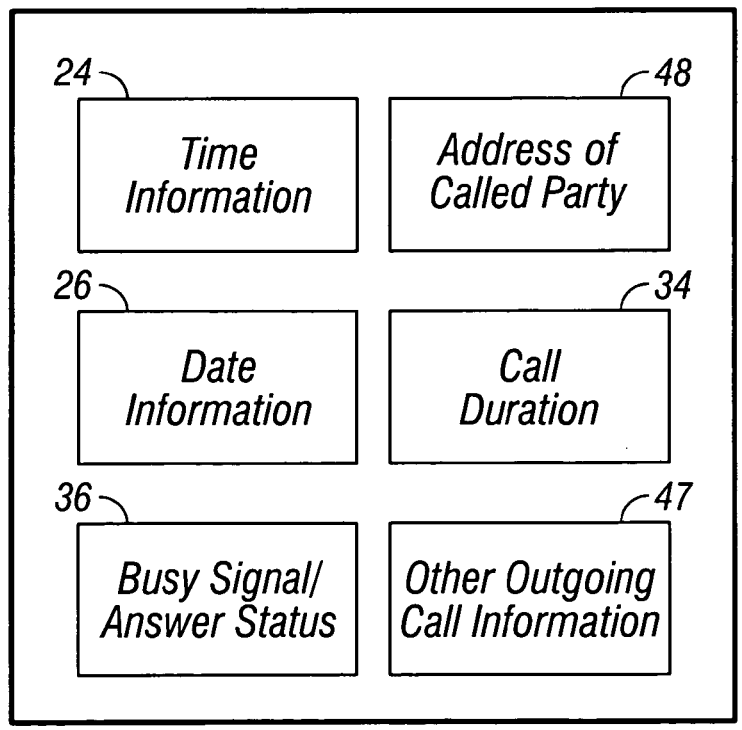
FIG. 4 depicts information tracked and stored during outgoing call flow.
Figure 3:
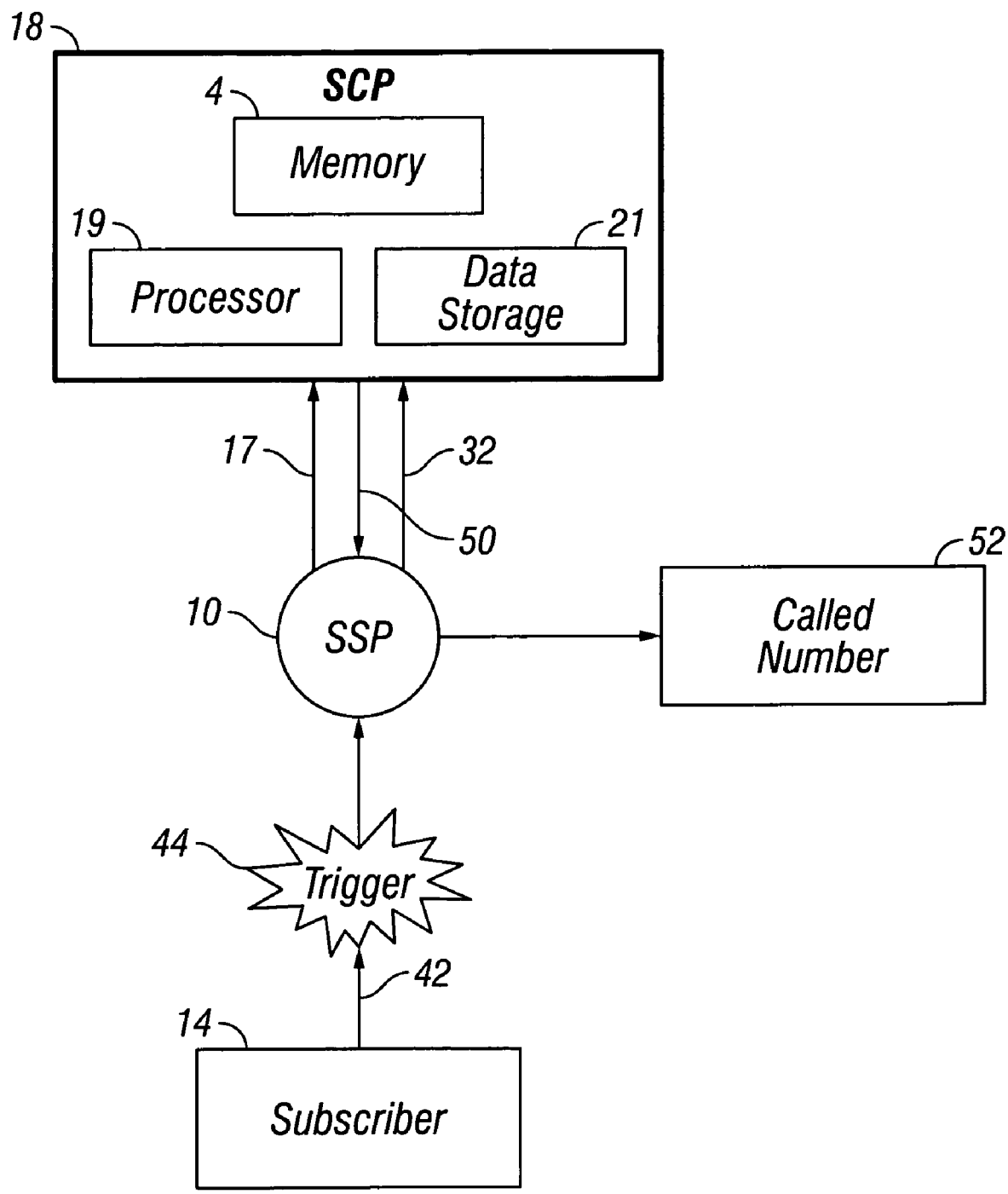
FIG. 3 is a flow diagram depicting an outgoing call flow.

FIG. 3 and FIG. 4 provide details on the methods for tracking and analyzing an outgoing call (42) of a subscriber (14) to a called number (52) in a communications network. In these embodiments, a communicant can be a subscriber (14). FIG. 3 is a flow diagram depicting an outgoing call flow. FIG. 4 depicts information tracked and stored during outgoing call flow.

An AIN SSP (10) detects a trigger (44) assigned to a subscriber (14) of the call tracking service. The specific trigger can be an off hook delay trigger or custom dialing plan trigger. The AIN SSP (10) sends an SDS query (17) to the SCP (18) with data storage (21).

The SCP (18) obtains outgoing call information (47) and an address of the called party (48) as well as time information (24) and date information (26) from a SDS query (17). The data, outgoing call information (47), address of the called party (48), time information (24) and date information (26) is stored in data storage (21).

The SCP (18) sends an Analyze Route Response (50) containing a Send Notification request to the AIN SSP (10). The AIN SSP (10) routes the outgoing call (42) to the called number (52).

After the call is completed, the calling party disconnects. The AIN SSP (10) sends a Termination Notification Message (32) to the SCP (18). The SCP (18) extracts call duration (34), busy signal/answer status (36) from the Termination Notification Message (32) along with time information (24) and date information (26). This data is packaged into a data packet and stored in data storage (21) at the SCP (18).

Each call record will be written to an ASCII format call data file. A new call data file can be started every half hour in each SCP to provide complete call tracking. The call data file can contain a header/trailer indicating date/time stamp, filename and number of call records in the file.

Figure 5:
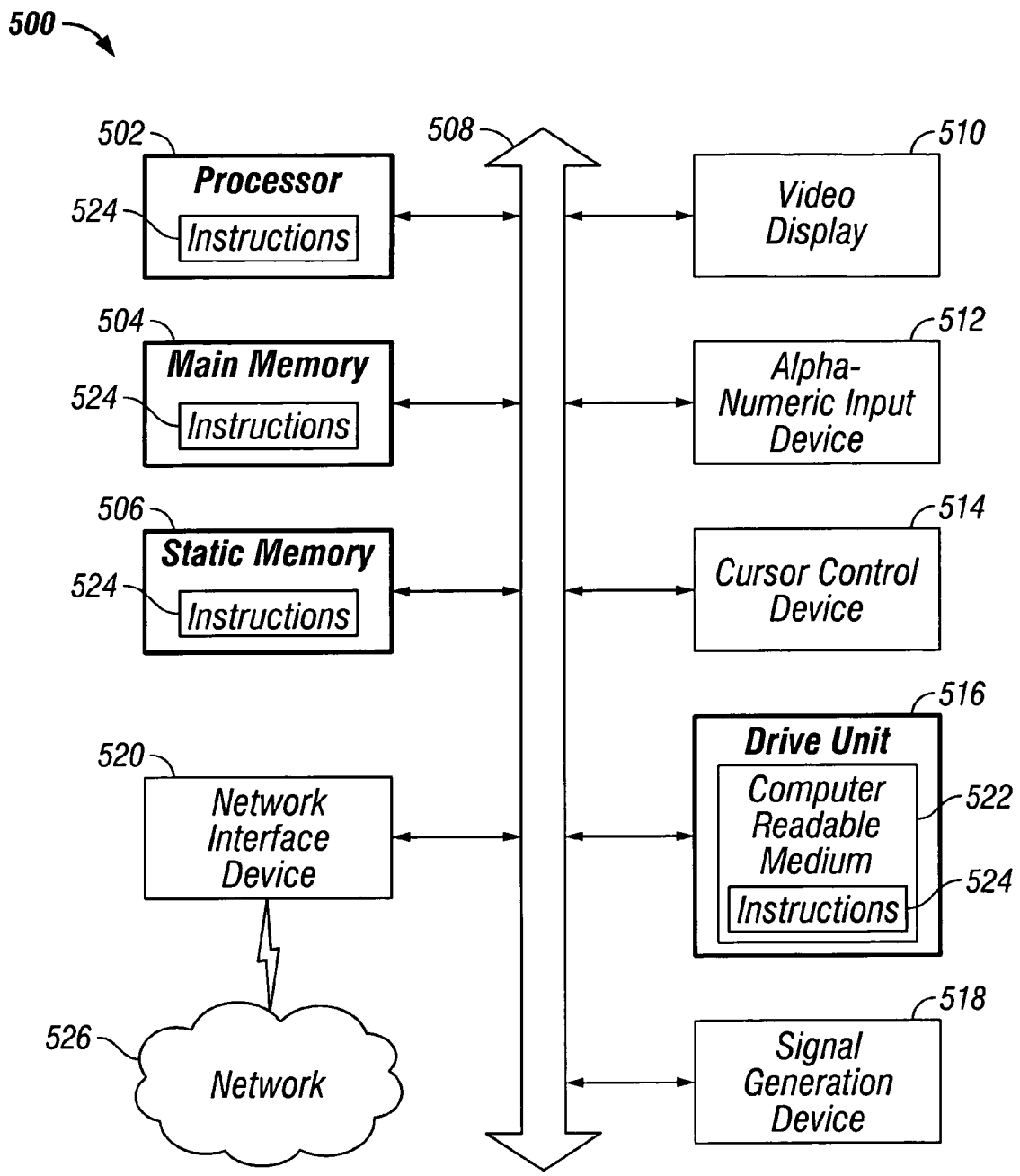
FIG. 5 is an illustrative embodiment of a general computer system usable with an embodiment of the invention.

FIG. 5 is an illustrative embodiment of a general computer system (500). The computer system (500) can include a set of instructions from the SCP that can be executed to cause the computer system (500) to perform any one or more of the methods or computer based functions disclosed herein. The computer system (500) can operate as a standalone device or can be connected, e.g., using a network, to other computer systems or peripheral devices.

In a networked deployment, the computer system can operate in the capacity of a server or as a client user computer in a server-client user network environment, or as a peer computer system in a peer-to-peer (or distributed) network environment. The computer system (500) can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system (500) can be implemented using electronic devices that provide voice, video or data communication. Further, while a single computer system (500) is illustrated, the term "system" shall also be taken to include any collection of systems or sub-systems that individually or jointly execute a set, or multiple sets, of instructions to perform one or more computer functions.

As illustrated in FIG. 5, the computer system (500) can include a processor (502), e.g., a central processing unit (CPU), a graphics processing unit (GPU), or both. Moreover, the computer system (500) can include a main memory (504) and a static memory 506 that can communicate with each other via a bus (508). As shown, the computer system 500 can further include a video display unit (510), such as a liquid crystal display (LCD), an organic light emitting diode (OLED), a flat panel display, a solid state display, or a cathode ray tube (CRT). Additionally, the computer system (500) can include an input device (512), such as a keyboard, and a cursor control device (514), such as a mouse. The computer system (500) can also include a disk drive unit (516), a signal generation device (518), such as a speaker or remote control, and a network interface device (520).

In a particular embodiment, as depicted in FIG. 5, the disk drive unit (516) can include a computer-readable medium (522) in which one or more sets of instructions (524), e.g. software, can be embedded. Further, the instructions (524) can embody one or more of the methods or logic as described herein. In a particular embodiment, the instructions (524) can reside completely, or at least partially, within the main memory (504), the static memory (506), and/or within the processor (502) during execution by the computer system (500). The main memory (504) and the processor (502) also can include computer-readable media.

In an alternative embodiment, dedicated hardware implementations, such as application specific integrated circuits, programmable logic arrays and other hardware devices, can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein can be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions (524) or receives and executes instructions (524) responsive to a propagated signal, so that a device connected to a network (526) can communicate voice, video or data over the network (526). Further, the instructions (524) can be transmitted or received over the network (526) via the network interface device (520).

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

Figure 6:
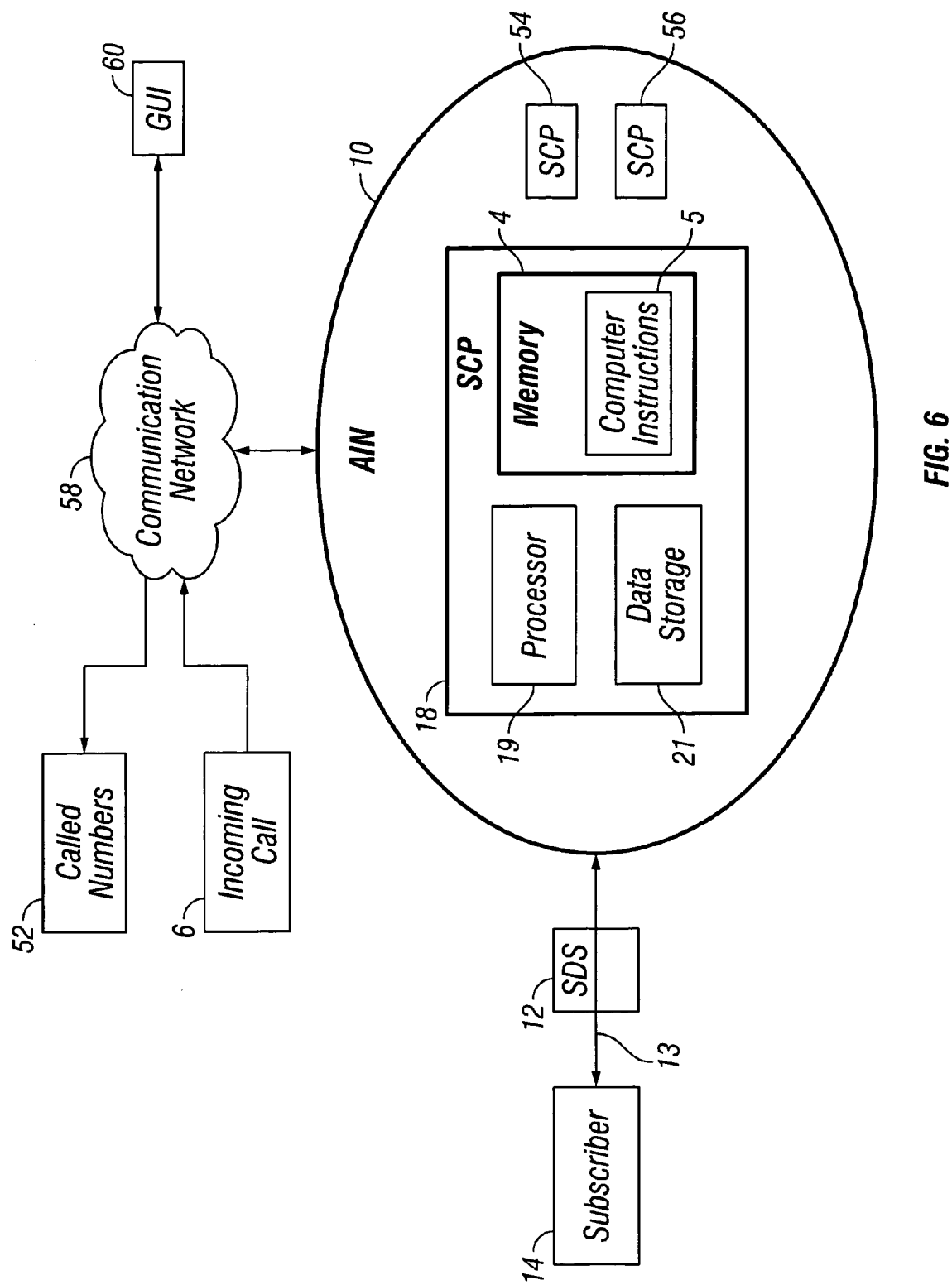
FIG. 6 depicts an example of a system for tracking data calls placed to or from a terminal of a call service subscriber.

FIG. 6 depicts an example of a system for tracking data calls placed to or from a terminal of a call service subscriber. A specific digit string trigger (SDS) (12) is associated with a communication line (13) of a call service subscriber (14). Data calls transmitted over the communication line (13) are received by an advanced intelligence network (AIN) (10). The AIN (10) includes at least one service control point (SCP) (18). FIG. 6 depicts three service control points (18, 54, and 56), but the one or more can be used with the embodiments. Each SCP (18) includes a processor (19) with memory (4), wherein computer instructions (5) for instructing the processor (19) are stored in the memory (4). Each SCP (18) includes a data storage (21) in communication with the processor (19).

The data calls received by the advanced intelligence network (AIN) (10) are stored in the data storage (21) of the corresponding SCP (18). Each data call is associated with an SDS (12). The identified SDS (12) in each data call directs the information associated with at data call to the correct SCP (18).

The data calls can include information, such as a subscriber number, a calling party number, a called party number, a call date, a call time, and combinations thereof. The information in the data calls relates to the information and statistics associated with data call from an origination phone or incoming call (6) and to destination phones or called numbers (52). The incoming call (6) and called numbers (52) are transmitted over a communication network (58) to and from the call service subscriber (14).

The SCP (18) collects and continuously updates call statistics for the data calls associated with the SDS (12). The call statistic are continuously updated and stored on a server or data storage (21) of the SCP (18). The call service subscriber (14) can contact the server or data storage (21) through a graphic user interface (60) in order to access the call statistics.

Figure 7:
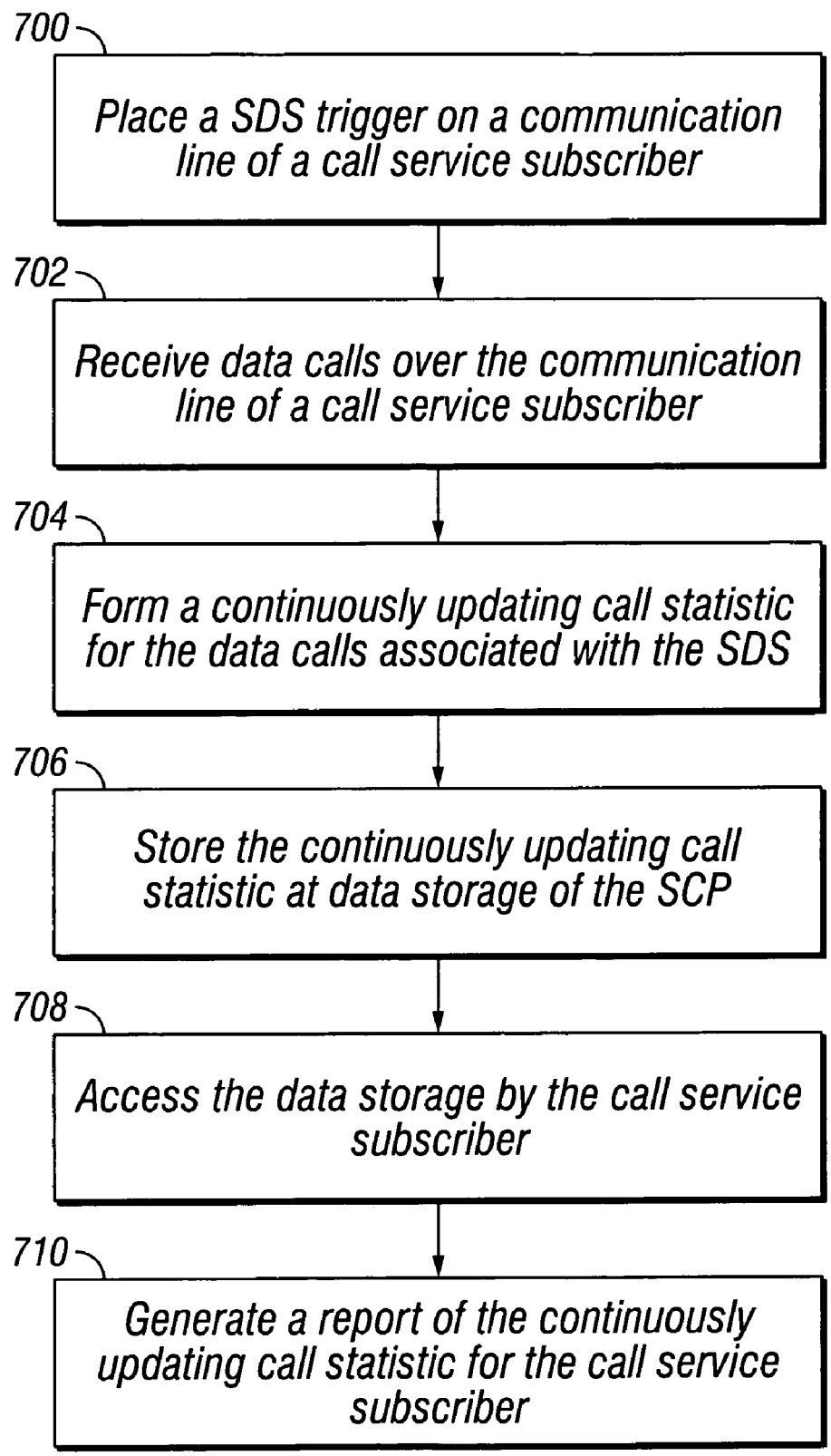
FIG. 7 is a flow diagram depicting the steps of an embodiment of the method.

FIG. 7 is a flow diagram depicting the steps of an embodiment of the method. An SDS trigger is placed on a communication line of a call service subscriber (Step 700). Data calls over the communication line are received by an AIN (Step 702). A continuously updating call statistic is formed for the data calls associated with the SDS (Step 704). The continuously updating call statistics are stored on a data storage associated with the SCP (Step 706). The call service subscriber can access the data storage (Step 708). A report of the continuously updating call statistic is generated for the data calls associated with a call service subscriber (Step 710).

The following table depicts a call detail record format and related elements which can be formed using the call tracker, and indicates the various filed names, numbers of characters and the description of the elements utilized. A total of 88 characters are shown for this embodiment:

| Field Name | # of Characters | Description |
|---|---|---|
| Start Time Stamp | 10 | Format: Unix standard |
| Tab Separator | 1 | |
| Time Zone | 7 | Format: CST |
| Tab Separator | 1 | |
| End Time Stamp | 10 | Format: Unix standard |
| Tab Separator | 1 | |
| Calling Party Number | 10 | Format: NPANXXXXXX |
| Tab Separator | 1 | |
| International Calling Party | 1 | Format: "1" = International_number "0" = National_number |
| Tab Separator | 1 | |
| Called Party Number | 15 | Format: XXXXXXXXXXXXXXX |
| Tab Separator | 1 | |
| Call Result | 2 | Format: "01" = Answered "02" = Busy "03" = Unanswered "04" = Caller_abandon "05" = Network_failure "06" = Time_out "66" = Unknown |
| Tab Separator | 1 | |
| Calling Party Name | 13 | Format: Same as CNAM service (could be state name) |
| Tab Separator | 1 | |
| Record Type | 2 | Format: "11" = incoming&type1 "21" = outgoing&type1 |
| Tab Separator | 1 | |
| Tab Separator for Blank Fields | 8 | |
| End of Record Indicator | 1 | Format: CR/LF |
| Total Characters/record | 88 | |

FIG. 8 is a sample of a call tracking report for a call service subscriber.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and can not be drawn to scale. Certain proportions within the illustrations can be exaggerated, while other proportions can be minimized. Accordingly, the disclosure and the figures are to be regarded as illustrative rather than restrictive.

One or more embodiments of the disclosure can be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose can be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for tracking calls placed to or from a terminal of a call service subscriber, the method comprising:
   placing a specific digit string (SDS) trigger on an advanced intelligence network (AIN) communication line at a service switching point (SSP), the communication line associated with a call service subscriber; and
   tracking a processed and routed call, wherein tracking comprises:
      determining that the SDS trigger is detected;
      receiving call information at a service control point (SCP) in response to the determining, the call information comprising information selected from the group consisting of a subscriber number, a calling party number, a called party number, a call date, a call time, and combinations thereof;
      forming a continuously updating call statistic at the SCP for the calls associated with the SDS; and
      storing the continuously updating call statistic to data storage of the SCP.

2. The method of claim 1, further comprising the step of accessing the data storage by the call service subscriber.

3. The method of claim 1, further comprising the step of generating a report of the continuously updating call statistic of the call data at the SCP for the call service subscriber.

4. The method of claim 1, wherein the step of accessing the data storage is performed using a graphical user interface.

5. The method of claim 1, wherein the calls are incoming and outgoing calls.

6. The method of claim 1, wherein the continuously updating call statistic is selected from the group consisting of an answered call, an unanswered call, a busy signal, time taken to answer a call, call duration, origination location of the call, time taken to indicate that call is busy, time taken to receive a busy signal, and combinations thereof.

7. The method of claim 1, further comprising the step of displaying in near real-time the call data in association with the results of a query transmitted to the service control point on a graphical user interface.

8. A system for tracking calls placed to a terminal of a call service subscriber, wherein the system comprises:

a. an advanced intelligence network (AIN) comprising a service switching point (SSP) and a service control point (SCP) wherein the SCP comprises a processor, memory, and data storage;

b. computer instructions for instructing the processor to place a specific digit string (SDS) trigger on a communication line at the SSP, the SSP associated with a call service subscriber;

c. computer instructions for instructing the processor to track call data associated with a call incoming to the subscriber in response to detecting the SDS trigger, the call data comprising a subscriber number, a calling party number, a called party number, a call date and time, and wherein the specific digit string trigger is associated with a call to the call service subscriber;

d. computer instructions for instructing the processor to form a continuously updating call statistic, at the SCP, for the calls associated with the SDS; and e. computer instructions for instructing the processor to store the formed continuously updating call statistic.

9. The system of claim 8, further comprising a graphical user interface for accessing the stored continuously updating call statistic.

10. The system of claim 8, further comprising computer instructions for instructing the processor to generate a report of the continuously updating call statistic of the call data for the call service subscriber.

11. The system of claim 8, wherein processing and routing of the call is performed independent of the SDS trigger.

12. The system of claim 8, wherein the continuously updating call statistic is selected from the group consisting of an answered call, an unanswered call, a busy signal, time taken to answer a call, call duration, origination location of the call, time taken to indicate that a call is busy, time taken to receive a busy signal, and combinations thereof.

13. The system of claim 8, wherein the data storage is further accessible by the call service subscriber via an interactive voice response unit.

14. The system of claim 8, further comprising computer instructions for instructing the processor to display in near real-time the call data in association with the results of a query transmitted to the service control point on the graphical user interface.

15. A computer readable medium for storing a program for implementing a method for tracking data calls placed to or from a terminal of a call service subscriber, comprising:

a. a receiving code segment that receives data calls over the communication line by an advanced intelligence network (AIN) comprising a service switching point (SSP) and a service control point (SCP), wherein the data calls comprise a member selected from the group consisting of a subscriber number, a calling party number, a called party number, a call date, a call time, and combinations thereof;

b. a forming code segment that forms a continuously updating call statistic at the SCP for data calls associated with a specific digit string (SDS) trigger placed on a communication line at the SSP; and c. a storing code segment that stores the continuously updating call statistic to data storage of the SCP.

16. The computer readable medium of claim 15, further comprising an access code segment that accesses the data storage by the call service subscriber.

17. The computer readable medium of claim 15, further comprising a generating code segment that generates a report of the continuously updating call statistic of the call data for the call service subscriber.

18. The computer readable medium of claim 15, further comprising a placing code segment that places the SDS trigger on the communication line at the SSP, the SSP associated with the call service subscriber.

* * * * *